Figures 1, 2, 3:
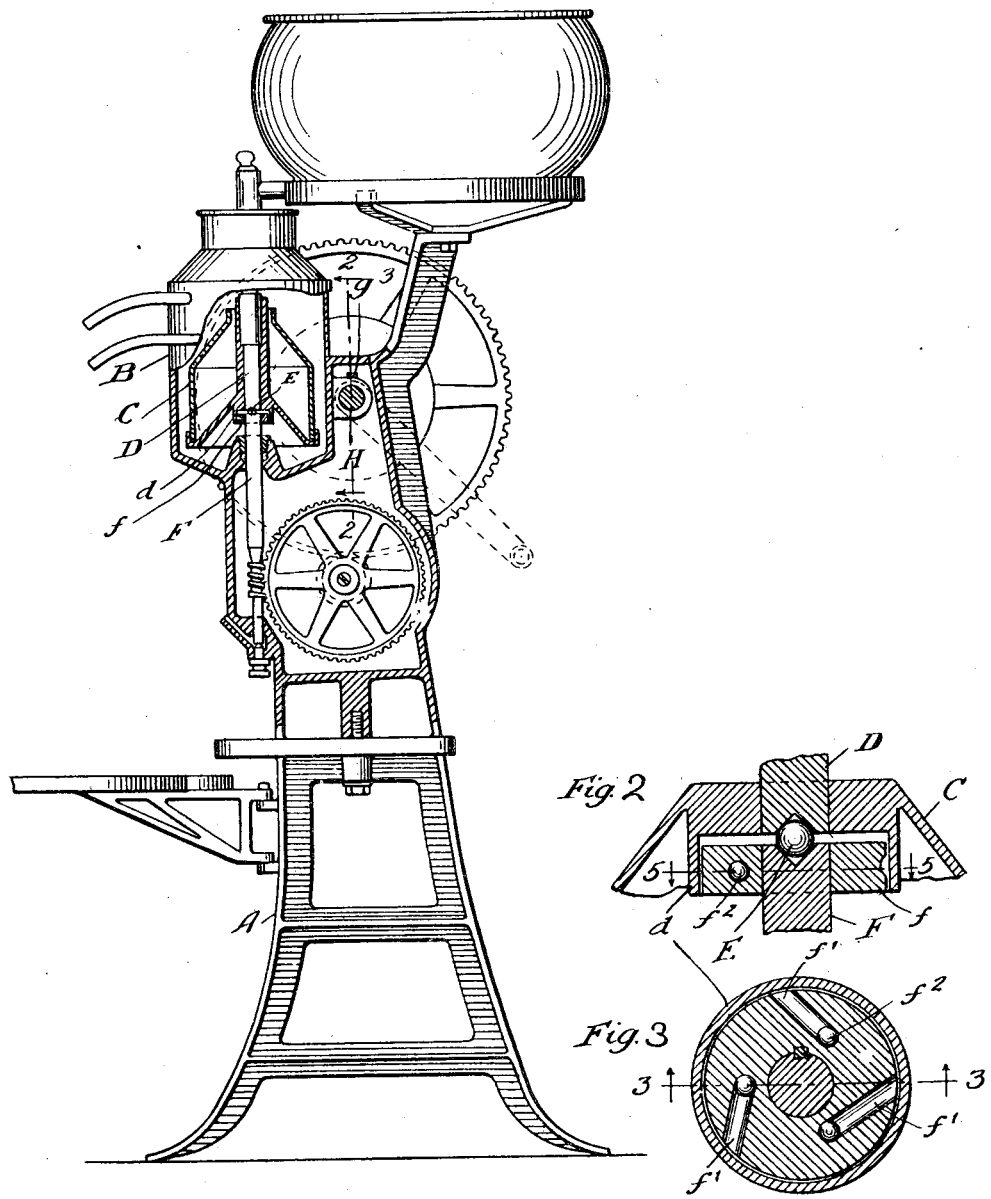

H. B. BABSON.
CLUTCH.
APPLICATION FILED JAN. 6, 1908.

1,079,094. Patented Nov. 18, 1913.

Witnesses:
Wm. Geiger

Inventor
Henry B. Babson
By Munday, Evarts, Adcock & Clarke.
Attorneys

UNITED STATES PATENT OFFICE.

HENRY B. BABSON, OF CHICAGO, ILLINOIS.

CLUTCH.

1,079,094.  Specification of Letters Patent.   Patented Nov. 18, 1913.

Application filed January 6, 1908. Serial No. 409,464.

*To all whom it may concern:*

Be it known that I, HENRY B. BABSON, a citizen of the United States, residing in Chicago, in the county of Cook and State of Illinois, have invented a new and useful Improvement in Clutches, of which the following is a specification.

My invention relates to improvements in clutches such as are more particularly adapted for use in centrifugal separators for separating cream from milk or for other purposes, and I shall describe my improved clutch as applied to such a separator.

It consists in connection with the casing and the rotating separator bowl therein and its shaft, of a separate piece driving shaft upon which the separator shaft rests, an antifriction or ball-bearing between the two, and an automatic friction clutch between the separator shaft and the driving shaft operating to positively clutch the separator shaft to the driving shaft when the latter is rotating at the higher speed, and to permit the separator bowl and separator shaft to rotate freely independent of the driving shaft when the power is shut off or the driving shaft is rotating at a slower speed than the separator bowl.

The friction clutch preferably consists of one or more balls traveling in inclined ways in a clutch member on the driving shaft and thrown by centrifugal force into contact with a surrounding sleeve connected with the separator shaft; so that the clutch operates to clutch the driving shaft to the separator shaft when the former tends to rotate the faster, while permitting the separator bowl and separator shaft rotate freely under their own momentum when the driving shaft is slowed down or the power cut off.

It further consists in connection with the casing and the rotating separator bowl and its shaft, of a centrifugal governor connected therewith, and a speed indicating finger connected with and operated by the governor to indicate at all times the speed of the separator bowl and enable it to be operated at the proper speed of rotation to produce economical separation of the milk and cream.

It further consists in the novel construction of parts and devices and in the novel combinations of parts and devices herein shown and described, and more particularly specified in the claim.

In the accompanying drawing forming a part of this specification, Figure 1 is a side elevation, partly in central, vertical section of a milk and cream separator embodying my invention. Fig. 2 is an enlarged detail section on line 3—3 of Fig. 3 and Fig. 3 is a detail horizontal section on line 5—5 of Fig. 2.

In the drawing, A represents the frame of the machine.

B is the casing of a centrifugal cream and milk separator of any suitable form or construction.

C is the rotating separator bowl and D its shaft.

F is the driving shaft and E is an antifriction bearing or ball interposed between the separator shaft D and the driving shaft F upon which the separator shaft rests and by which it is driven. The rotating separator bowl C or its shaft D is furnished with a sleeve $d$, which may be made integral with the separator bowl C and which surrounds a friction clutch disk $f$ fixed to the driving shaft F, and which is furnished with a plurality of inclined races or grooves $f^1$, each containing a ball $f^2$ adapted to be thrown by centrifugal action outward in contact with the clutch sleeve $d$ fixed to the separator bowl C or its shaft, and thus cause said clutch shell $d$ to be frictionally gripped by the ball $f^2$ to the clutch disk $f$ whenever the driving shaft F is rotating at a higher speed than the separator bowl C, but which will at the same time permit the separator bowl C or the clutch sleeve $d$ to rotate freely independent of the shaft F whenever the speed of the shaft F is slowed down so that it is less than that of the separator bowl and separator shaft. The friction clutch $d$, $f$, $f^1$, $f^2$ thus only operates to clutch the parts together in one direction. This results in material economy as the separator bowl C, owing to its high speed and momentum, will rotate for a considerable time at a working speed after the power is shut off from the driving shaft F.

H represents the shaft through which power is derived for driving the mechanism.

I claim:—

In a device of the character described, the combination with an upright rotating shaft, of a driving shaft adapted to serve as a separator shaft of a centrifugal cream separator, a ball-bearing interposed between the lower end of the first named shaft and the upper end of the driving shaft, and a friction clutch comprising a shell fixed to one of said shafts and a disk secured to the other of said shafts having an inclined race and a ball traveling therein, substantially as specified.

HENRY B. BABSON.

Witnesses:
H. M. MUNDAY,
PEARL ABRAMS.